(12) United States Patent
Bekker et al.

(10) Patent No.: US 8,239,074 B2
(45) Date of Patent: Aug. 7, 2012

(54) GENERATING A NONLINEAR FUNCTION FOR FAN CONTROL

(75) Inventors: Leonid A. Bekker, Holbrook, NY (US); Robert W. Schoepflin, Port Jefferson, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 280 days.

(21) Appl. No.: 12/788,590

(22) Filed: May 27, 2010

(65) Prior Publication Data

US 2011/0295442 A1    Dec. 1, 2011

(51) Int. Cl.
G05D 23/00    (2006.01)
(52) U.S. Cl. ........ 700/300; 700/299; 702/130; 702/132; 361/676; 361/688; 713/330; 713/340
(58) Field of Classification Search .......... 700/299–300; 702/130, 132; 361/676, 688, 695; 713/330, 713/340
See application file for complete search history.

(56) References Cited

U.S. PATENT DOCUMENTS

| | | | |
|---|---|---|---|
| 4,727,468 A | 2/1988 | Maekawa | |
| 5,307,439 A | 4/1994 | Enami | |
| 5,727,928 A * | 3/1998 | Brown | 417/44.11 |
| 5,825,972 A * | 10/1998 | Brown | 388/811 |
| 5,942,866 A | 8/1999 | Hsieh | |
| 6,051,952 A | 4/2000 | Moreira et al. | |
| 6,126,079 A * | 10/2000 | Shoemaker | 236/35 |
| 6,188,189 B1 * | 2/2001 | Blake | 318/471 |
| 6,208,538 B1 | 3/2001 | Halamik et al. | |
| 6,226,324 B1 | 5/2001 | Allstrom | |
| 6,318,905 B1 | 11/2001 | Valencia et al. | |
| 6,519,167 B1 * | 2/2003 | Nguyen | 363/41 |
| 6,528,987 B1 * | 3/2003 | Blake et al. | 324/168 |
| 6,661,679 B1 * | 12/2003 | Yang et al. | 363/41 |
| 6,735,499 B2 * | 5/2004 | Ohki et al. | 700/299 |
| 6,757,592 B1 * | 6/2004 | Henderson et al. | 700/299 |
| 6,874,327 B1 * | 4/2005 | Wahler et al. | 62/178 |
| 7,075,261 B2 * | 7/2006 | Burstein | 318/400.11 |
| 7,092,623 B2 * | 8/2006 | Bekker | 318/400.37 |
| 7,096,134 B2 * | 8/2006 | Miller, Jr. | 702/79 |
| 7,295,897 B2 * | 11/2007 | Marando et al. | 700/278 |
| 7,847,681 B2 * | 12/2010 | Singhal et al. | 340/514 |
| 7,987,024 B2 * | 7/2011 | Tunks et al. | 700/299 |
| 2006/0193729 A1 | 8/2006 | Marando et al. | |
| 2008/0105033 A1 * | 5/2008 | Tipler et al. | 73/23.42 |
| 2010/0315223 A1 * | 12/2010 | Gross et al. | 340/500 |

OTHER PUBLICATIONS

Analog Devices, Publication ADM1027, "dBCOOL Remote Thermal Controller and Voltage Monitor," 2003, 56 pages.

(Continued)

*Primary Examiner* — Ramesh Patel
(74) *Attorney, Agent, or Firm* — Meyertons Hood Kivlin Kowert & Goetzel, P.C.; Jeffrey C. Hood; Joel L. Stevens

(57) ABSTRACT

System and method for controlling a fan. A value may be received for controlling the fan. The value may include a first number of bits and may correspond to a linear function of temperature. A first value may be determined using a first number of bits of the value. A modification to the first value may be determined based on a second number of bits of the value. A new output value may be generated based on the first value and the modification to the first value. The new output value may correspond to a first nonlinear function of temperature. The new output value may be provided for controlling the fan.

25 Claims, 5 Drawing Sheets

OTHER PUBLICATIONS

National Semiconductor Corporation, Publication LM63, "+/−1 degree C Accurate Remote Diode Digital Temperature Sensor with Integrated Fan Control," Feb. 2003, 28 pages.

Stephen Ohr, "Analog IC vendors find "Intel Inside" a safe bet," Sep. 12, 2002, online at http://www.eetimes.com/story/OEG20020912S0026, 1 page.

* cited by examiner

GENERATING A NONLINEAR FUNCTION FOR FAN CONTROL

BACKGROUND OF THE INVENTION

1. Field of the Invention

This invention relates to fan control and, more particularly, to generating a nonlinear function for fan control.

2. Description of the Related Art

Fans are often used to evacuate warm air from enclosures in which electronic systems are contained. For example, most computer systems include at least one fan to aid in system cooling. The increased airflow provided by fans aids in eliminating waste heat that may otherwise build up and adversely affect system operation.

Control of fans in a system typically involves a fan control unit executing a fan control algorithm. A fan control algorithm may determine the method for controlling one or more fans that are configured to evacuate warm air from a system enclosure. For example, the fan control algorithm may specify that a fan's speed should be increased or decreased dependent upon a detected temperature. Such control algorithms may also involve turning off a fan if the temperature is deemed cool enough to do so.

Fan drive systems often use a PWM generator to drive an external circuit that controls the voltage between the power and ground interfaces of the fan, which in turn controls the speed of the fan. PWMs are useful because they provide a digital control for the pulse width of a signal. The fan is turned on for the duration of the pulse and turned off between pulses. The duty cycle of the pulse train currently being provided to the fan determines the fan's speed.

One problem that results from using PWMs to drive fan circuits is that the fan noise increases when the duty cycle of the PWM is changed. Typically, linear algorithms are used to control how the duty cycle of the PWM changes in response to increases in temperature. Thus, the duty cycle of the PWM will undergo the same amount of change per degree of temperature change, regardless of how the temperature relates to the allowable range of temperatures. Other solutions involve the use of piecewise linear equations, which are computationally intensive and hardware expensive. Accordingly, improvements in fan control are desired.

SUMMARY

Various embodiments are presented of a system and method for controlling a fan.

A value may be received for controlling the fan. The received value may include a first number of bits and may correspond to a linear function based on temperature. For example, the received value may be provided by linear output circuitry which may be configured to provide PWM (pulse width modulation) values (e.g., PWM duty cycles) which have a linear relationship with temperature. Alternatively, the received value may be related to the RPM (revolutions per minute) of the fan. In further embodiments, the received value may simply be a percentage or degree of a minimum and maximum, and that percentage may be used to generate RPM or PWM values for controlling the fan. Thus, the received value, or some proportional derivative thereof, may generally be used to control the fan, e.g., the speed of the fan, the percentage of time that the fan operates, etc.

A first value may be determined from a first number of bits of the received value. The first value may be stored in a memory medium, e.g., among a plurality of values. For example, the memory medium may store a lookup table that may be used to determine values based on the first number of bits of the received value. The stored values may correspond to boundaries of a nonlinear equation based on temperature. Thus, the values may be used as a translation function for translating from a first function (e.g., the linear function described above) to a nonlinear equation, described in more detail. Thus, the determination of the first value may convert the initial value of a linear function to a boundary point of a nonlinear function formed by the plurality of values.

The plurality of values (which includes the first value) may be of the same type and/or units as the received value. For example, if the received value is with respect to PWM, the first value may also be with respect to PWM. Similarly, if the received value is with respect to RPM or a percentage of time that the fan operates, then the first value may also be with respect to RPM or the percentage, respectively. However, in further embodiments, the first value may be some conversion from one metric to another (e.g., from PWM to RPM, percentage to PWM, percentage to RPM, etc.).

Additionally, a modification to the first value may be determined based on a second number of bits of the received value. In one embodiment, the first number of bits may be the most significant bits and the second number of bits may be the least significant bits. For example, the received value may have 8 total bits and the first 4 bits may be used to look up the first value (e.g., in a lookup table) and the second number of bits may be used to calculate a modification to the first value.

The determination (or calculation) of the modification of the first value may involve determining a difference between the first value and a next value, e.g., a next higher value among the plurality of values (e.g., stored in the lookup table). According to various embodiments, this difference may be determined dynamically or "on the fly" during runtime, or may be pre-calculated and stored, e.g., in the memory medium or lookup table. Thus, in one embodiment, the first number of bits may be used to determine the first value and the difference between the first value and the next value. Note that the difference may be stored in the same memory medium (or lookup table) or a different memory medium (or different lookup table).

Determining the modification may also involve multiplying the difference between the first value and the next value by the value of the second bits (e.g., the value of the least significant bits). Finally, the modification may be determined by shifting the product of the multiplication by the second number bits (e.g., the number of least significant bits). Note that there is a significant difference between the value of the least significant bits and the number of least significant bits (value being what the numbers represent and the number being the actual number of bits).

Thus, the modification may be determined according to the following formula:

$$[i(Y-X)] \gg \#LSbs;$$

where i is the value of the second number of bits, X is the first PWM value, Y is a next PWM value, and #LSbs is the number of second bits.

A new output value may be generated based on the first value and the modification to the first value, e.g., by adding the first value and the modification. The new output value corresponds to a nonlinear function of temperature. Thus, the determination of the modification (and subsequent application of that modification) may transform the boundary points of the translation function of the plurality of values (from the first value above) to a smoother nonlinear function (i.e., that is based on but different from the translation function). Thus, the determinations, modifications, and generation may operate to convert a linear function to a nonlinear function (e.g., one value along the linear function to another value along the nonlinear function).

Accordingly, the new output value may be provided for controlling the fan. For example, the new output value may be a PWM duty cycle that is provided to a PWM generator. The PWM generator may then control the fan based on the provided new output value. Alternatively, the new output may be an RPM value or percentage value that is then used to control the fan. Note that the percentage value or RPM value may still ultimately be provided to the PWM generator, but may be further processed before being provided, e.g., converted to a PWM duty cycle value.

In some embodiments, the receiving, determinations, and generation described above may be performed by control logic that intercepts the initial value from the linear output circuitry and modifies it before providing it to the PWM generator, e.g., to convert the linear output to a more desirable nonlinear output.

Note further that the methods described above may be applied for a variety of instances other than fan control. Thus, the method above may be generalized for conversion of any monotonic function into a desired nonlinear function, e.g., to control physical systems.

BRIEF DESCRIPTION OF THE DRAWINGS

Other aspects of the invention will become apparent upon reading the following detailed description and upon reference to the accompanying drawings in which.

Figure 1:
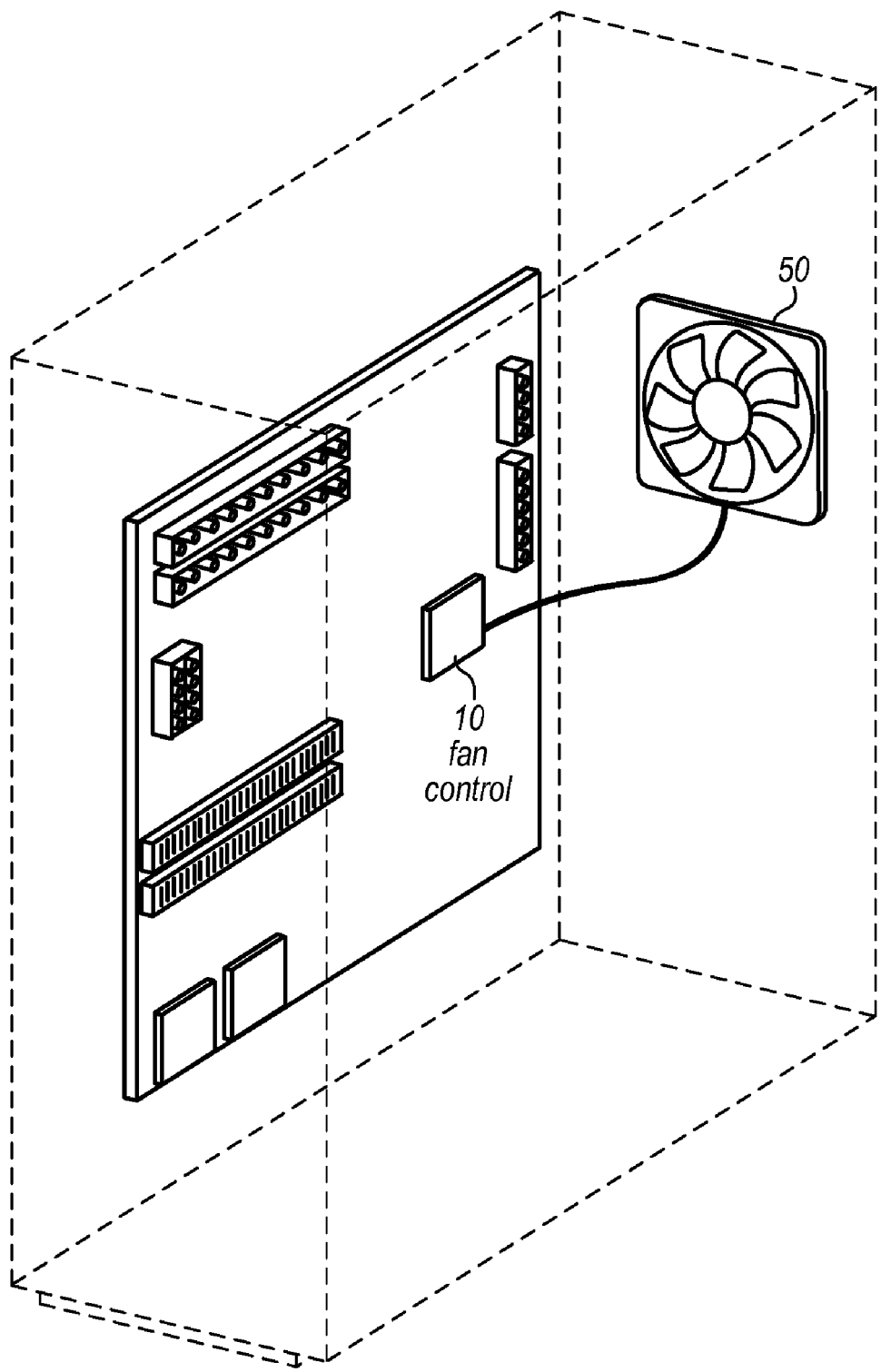
FIG. 1 illustrates an exemplary system including a fan and control, according to one embodiment.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF EMBODIMENTS

Incorporation by Reference

U.S. patent application Ser. No. 10/440,745 titled "Piecewise Linear Control of the Duty Cycle of a Pulse Width Modulated Signal" filed on May 19, 2003 whose inventors are Eileen M. Marando and Robert W. Schoepflin is hereby incorporated by reference as though fully and completely set forth herein.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

FIG. 1—Exemplary System

FIG. 1 shows an embodiment of an exemplary system which may utilize a fan 50 for cooling a computer system 100. The fan 50 may be powered with a PWM (Pulse Width Modulated) signal or other type of signal which may be generated by a controller 10, which may be included in a larger device (e.g., the motherboard of the computer system 100). Thus, in the exemplary embodiment of FIG. 1, the computer system 100 includes the controller 10 and the fan 50.

In embodiments described herein, the signal generated by fan controller 10 is used to control operation of the fan 50, e.g., whether the fan 50 is turned on or not, the speed at which the fan operates, etc. For example, the signal generated by the fan controller may be a duty cycle for PWM generator, or may be a value used to generate a desired PWM duty cycle (e.g., a value which specifies the percentage of the time the fan should operate). Similarly, the signal generated by the fan controller may specify the RPM of the fan, or may be a value used to generate a desired RPM value of the fan (e.g., a value which specifies the percentage of the maximum RPM). As used herein a "PWM value" refers to a value which is, or is used to generate, a PWM duty cycle. Similarly, a "RPM value" refers to a value which is, or is used to generate, a target RPM of the fan.

Note that while the system of FIG. 1 illustrates a computer system 100 including a chassis, fan, and motherboard (including the controller 10), the controller 10 and fan 50 may be included in any of various systems that require cooling. Additionally, the controller 10 may be included in other devices, be a stand alone device, be its own integrated circuit, etc. Thus, the fan 50 and controller 10 may be included in an enclosure containing various electronic devices, such as the desktop computer chassis shown in FIG. 1, a storage array enclosure, or any other enclosure.

Figure 2:
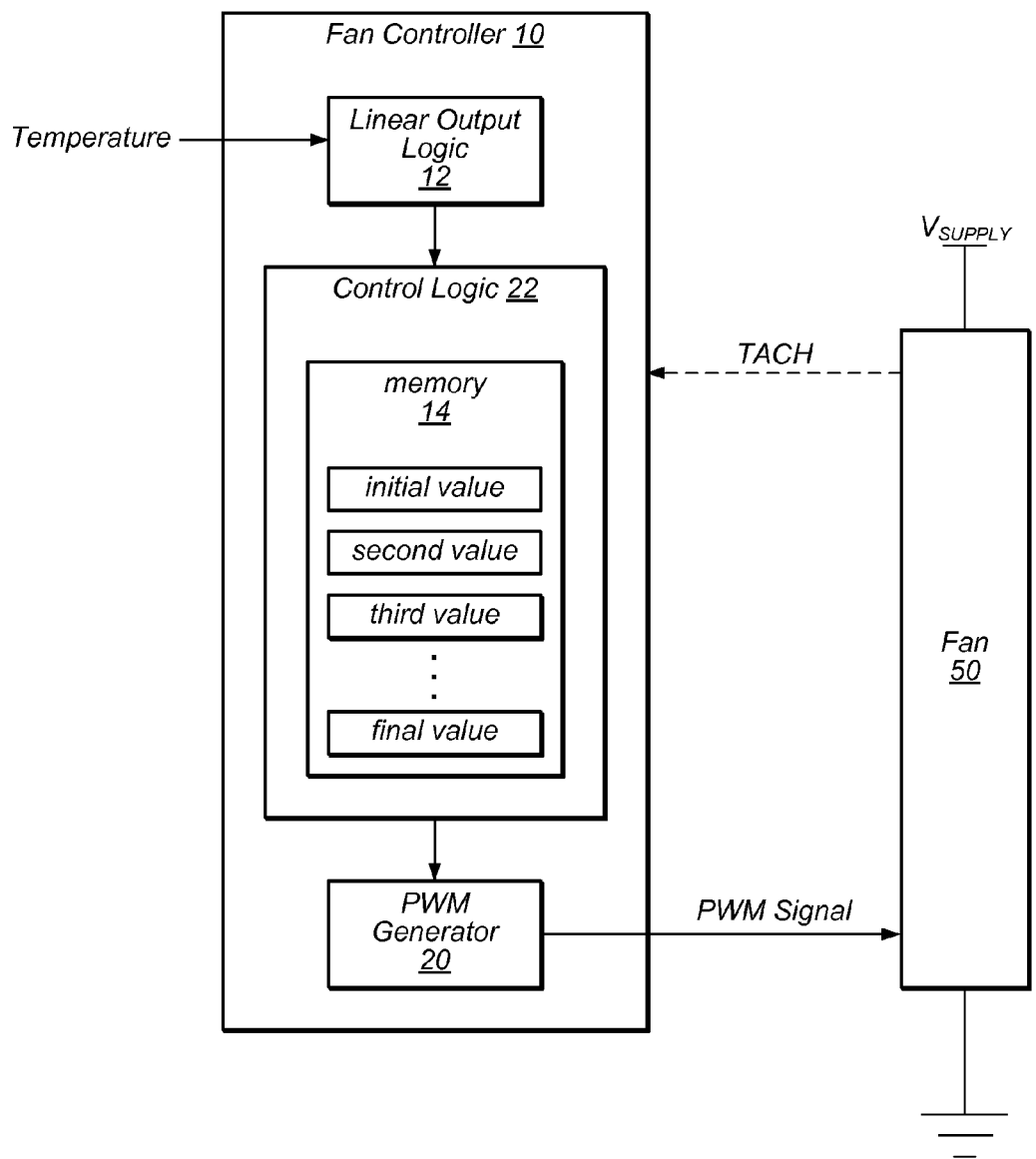
FIG. 2 is a block diagram of a system for controlling a fan, according to one embodiment.

FIG. 2—Exemplary Block Diagram of the Controller and Fan

As shown in FIG. 2, the fan controller 10 includes linear output logic 12, control logic 22, and a PWM (Pulse Width Modulator) generator 20 configured to generate the PWM signal. As shown, the fan controller 10 may also receive an indication of temperature, which may be received by linear output logic 12. Linear output logic 12 may provide an output based on the temperature, where the output is based on a linear relationship with respect to temperature. However, it should be noted that while linear output logic 12 is described with respect to a linear relationship with respect to temperature, it may be any monotonic relationship. For the remainder of the description, however, it will be described as having a linear relationship. The linear output logic 12 may provide a PWM value, an RPM value, a percentage value, or any other value that is used to control the fan 50. In the embodiment shown, the linear output logic 12 may provide a PWM value (e.g., a percentage of possible PWM or a PWM duty cycle). The linear output logic 12 may be similar to prior art linear output fan control devices.

The control logic 22 may be configured to receive the linear output value (also referred to as the "received value") from the linear output logic 12. As described herein, the control logic 22 may be configured to convert the linear output value from the linear relationship to a nonlinear relationship. The control logic 22 may be configured to do this by determining a first number of bits (e.g., the most significant bits) from the linear output value and a second number of bits (e.g., the least significant bits) from the linear output value. The first number of bits may be used to determine a first value, which may be stored in the memory 14 of the control logic 22. For example, the memory 14 may include a lookup table or a plurality of registers which store a plurality of values. Similar to above, these values may be PWM values, RPM values, percentage values, etc. These values may specify boundary points of a nonlinear function and may be used as a translation function for converting form a linear output value to a nonlinear output value. Note that the number of stored values may be any desirable number, e.g., any power of 2, e.g., 2, 4, 8, 16, 32, etc. As one example, the number of values may be 16.

The various boundary points may be programmed to approximate various curves. For example, in one embodiment, the points may approximate a parabola such that the first segment has a smaller slope than later segments. In other embodiments, other curves may be approximated. In some embodiments, the slopes of the various linear segments may have higher slopes in higher temperature ranges. In other embodiments, successive linear segments may have decreasing slopes, or both increasing and decreasing slopes.

The memory 14 may also store differences between the values, e.g., in a same lookup table or a different lookup table. These differences may be used to determine a modification to the first value based on a formula that may use the second number of bits from the linear output value. However, in alternate embodiments, the memory 14 may not store the differences between the values, and those differences may be calculated during run time.

The control logic 22 is further configured to provide an output to control the fan. This output may be according to a nonlinear function with respect to temperature. Thus, the control logic may convert a linear output value to a nonlinear output value, as described herein. In the particular embodiment shown in FIG. 2, the control logic 22 may be configured to provide a PWM value indicative of the duty cycle to the PWM generator 20, and the PWM generator 20 is configured to responsively generate the PWM signal having that duty cycle. PWM generator 20 is an example of a means for powering the fan 50 according to a PWM signal having a duty cycle dependent on a duty cycle value. Control logic 22 is an example of a means for generating values for controlling the fan 50 based on received linear values.

The fan 50 may have two ports (power and ground) or three ports (power, ground, and tachometer) in some embodiments, among other possibilities. In some embodiments in which the fan 50 has three ports, the fan controller 10 may generate the PWM signal (or other type of signal) dependent on the fan tachometer signal.

In some embodiments, the PWM signal may be input to fan drive circuitry (not shown) such as a switch. For example, fan drive circuitry may include a switch coupled between the ground input of the fan 50 and ground. When the PWM signal is high, the switch may close, connecting the ground interface of the fan 50 to ground. When the PWM is low, the switch may open, creating an open circuit between the ground interface of the fan 50 and ground. Accordingly, opening the switch by deasserting the PWM signal turns off the power to the fan 50. Note that the PWM signal may be an active high or an active low signal. For example, if the switch is implemented using a PNP transistor, switch may close when the PWM signal is low. In such an embodiment, the switch may be coupled to the power interface of the fan 50 (as opposed to the ground interface) between the power interface and the power source. When the switch is closed, the power interface of the fan 50 is connected to the power source, turning on the fan 50. Note that other embodiments may include different fan drive circuitry or no fan drive circuitry at all (e.g., the PWM signal may be input directly to one of the fan's input terminals).

As the duty cycle (the ratio of the time in which the PWM signal is asserted to the time in which the PWM signal is deasserted) of the PWM signal increases, the fan is powered for a greater percentage of time each cycle. Consequentially, the fan speed increases. Similarly, as the duty cycle decreases, the fan speed decreases. Thus, fan controller 10 may control the speed of the fan 50 by varying the duty cycle of the PWM signal. As indicated above, while FIG. 2 illustrates a fan controller 10 (including the PWM generator 20) that operates using PWM signals, other types of signals are envisioned.

Thus, fan controller 10 may receive an indication of the current temperature (e.g., by detecting the current temperature itself or by receiving a digital or analog signal representing the temperature detected by another device) and control the fan speed dependent on the current temperature. As the temperature increases, the fan controller 10 may increase the fan speed in order to provide increased cooling. If the temperature decreases, the fan controller 10 may decrease the fan speed. If the temperature stabilizes, the fan controller 10 may keep the fan speed the same. Note that in many embodiments, the fan controller 10 may control the fan according to other parameters, e.g., in addition to the current temperature. For example, in some embodiments, the fan controller 10 may detect both the current temperature and the rate of temperature change experienced in the most recent period. In such embodiments, the fan controller may be configured to selectively vary the output value less at higher values of the temperature if the temperature is stabilizing than if the temperature is increasing. Other parameters may also affect how the fan controller 10 modifies the output value (e.g., the PWM duty cycle).

In further embodiments, the fan controller 10 may be configured to automatically update the values of the values stored in memory 14 based on various factors, such as those described above, among others. For example, if the ambient temperature (outside of the cooling area) is above a threshold (e.g., is warmer than the temperature in the cooling area) then the behavior of the fan may be changed, e.g., by automatically changing the values stored in the memory 14, e.g., during runtime. Thus, the nonlinear function may be changed at any point, e.g., prior to run time or dynamically, during run time. Additionally, or alternatively, the stored PWM values may be changed in response to input provided to change those values, e.g., which may come from a user or software program.

Where the changes occur based on specific input from a user specifying the changes, they may be referred to as "manual" changes. Where the changes occur based on factors or computer software (but are not based on specific input from a user changing the values), they may be referred to as "automatic" changes, e.g., performed by the control logic.

Note that at least a portion of the system shown in FIGS. 1 and 2 may be implemented as an integrated circuit. For example, in one embodiment, the fan controller 10 may be implemented as an integrated circuit. Other system functionality (e.g., bus bridge or system controller functions) may also be included in such an integrated circuit in some embodiments.

Figure 3:
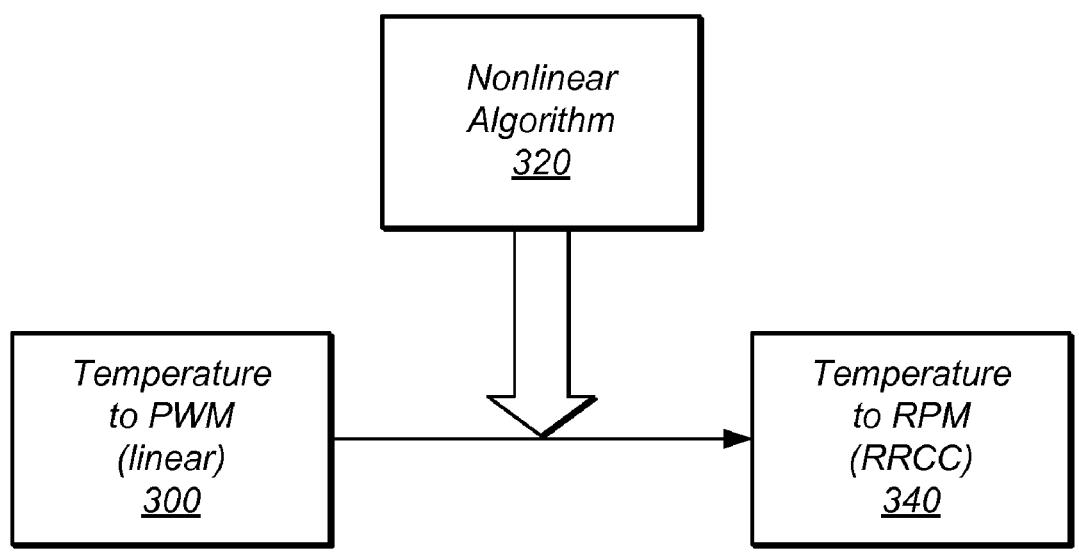
FIG. 3 illustrates a system block diagram, according to one embodiment.

FIG. 3—Exemplary System

FIG. 3 illustrates an exemplary system where the methods described herein may be applicable. As shown, a temperature to PWM block 300 may generate linear output values according to a linear function, e.g., similar to the linear output logic 12. In typical systems, this linear output may be provided to temperature to RPM RRCC (ramped rate closed-loop control) block 340. RRCC block 340 may be generally used to provide closed loop feedback of the RPM of the fan and provide adjustments to the fan (e.g., separate from the control algorithms 300 and 320) to ensure that the fan maintains the proper RPM. RRCC block 340 may for example provide post processing functionality to correct any RPM errors when the error exceeds a band or threshold.

However, as shown in FIG. 3, the nonlinear algorithm 320 described herein may be used to intercept the output of the linear block 300 and map the linear output to a nonlinear output, before being provided to RRCC block 340. Thus, FIG. 3 illustrates an exemplary system where the nonlinear algorithm 320 described herein may be inserted in an existing system.

Figure 4:
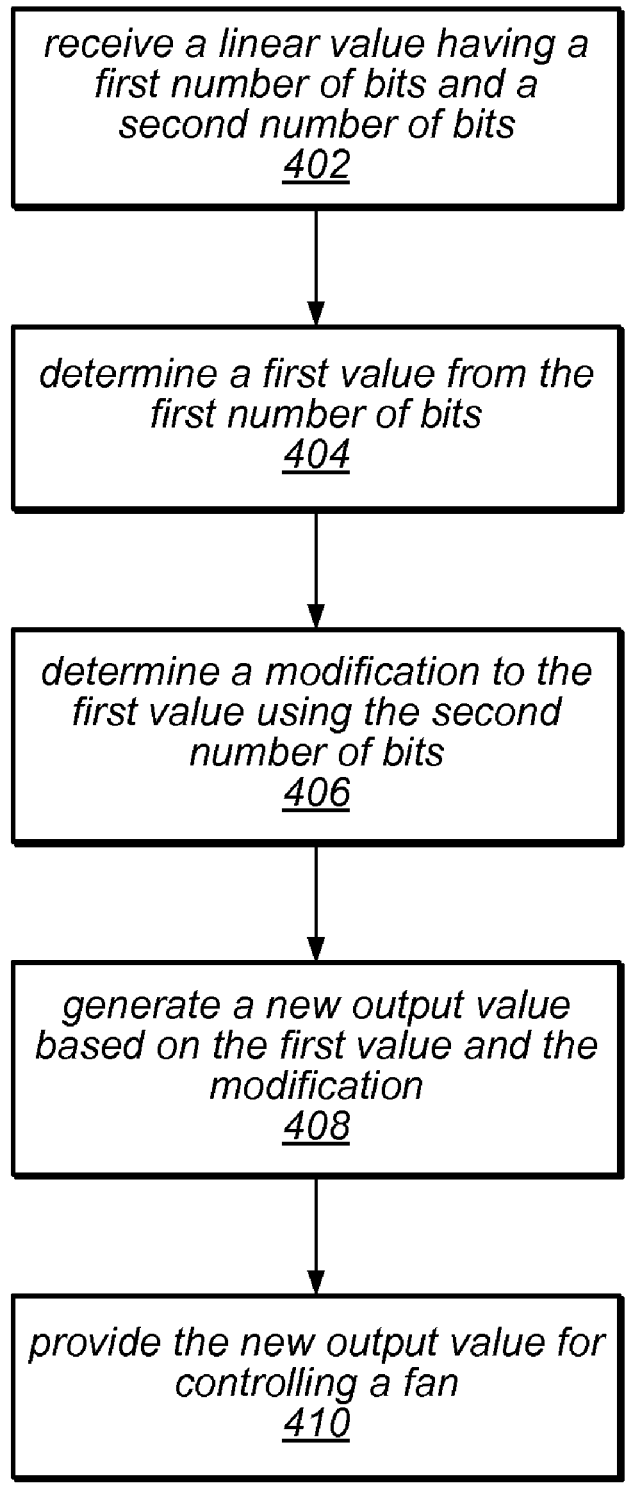
FIG. 4 is a block diagram illustrating one embodiment of a method for controlling a fan.

FIG. 4—Method for Controlling a Fan

FIG. 4 illustrates one embodiment of a method for controlling a fan. The method shown in FIG. 4 may be used in conjunction with any of the systems or devices described herein, among other devices. In various embodiments, some of the method elements shown may be performed concurrently, in a different order than shown, or may be omitted. Additional method elements may also be performed as desired. As shown, this method may operate as follows.

In 402, a value may be received for controlling the fan. The received value may include a first number of bits (e.g., 8) and may correspond to a linear function of temperature. For example, the received value may be provided by linear output circuitry (e.g., linear output logic 12) which may be configured to provide PWM (pulse width modulation) values (e.g., PWM duty cycles) which have a linear relationship with temperature. Alternatively, the received value may be related to the RPM (revolutions per minute) of the fan. In further embodiments, the received value may simply be a percentage or degree of a minimum and maximum, and that percentage may be used to generate RPM or PWM values for controlling the fan. Thus, the value, or some proportional derivative thereof, may generally be used to control the fan, e.g., the speed of the fan, the percentage of time that the fan operates, etc.

In 404, a first value (e.g., a first PWM value) may be determined from a first number of bits of the received value. The first value may be stored in a memory medium, e.g., among a plurality of values. For example, the memory medium may store a lookup table that may be used to determine values based on the first number of bits of the received value. More specifically, the value of the first number of bits may be used as a pointer to the value in the lookup table. The stored values may correspond to boundaries of a nonlinear equation based on temperature. Thus, the values may be used as a translation function for translating from a first function (e.g., the linear function described above) to a nonlinear equation, described in more detail. In one embodiment, the boundaries may be thought of as specifying the minimum and maximum values for each piecewise linear equation and the minimum and maximum values for the overall temperature range (via the initial and final points). Thus, the determination of the first value may convert the initial value of a linear function to a boundary point of a nonlinear function formed by the plurality of values. Thus, the determination of the first value may convert the initial value of a linear function to a value of the nonlinear function. Note that the number of stored values may be any desirable number, e.g., any power of 2, e.g., 2, 4, 8, 16, 32, etc. As one example, the number of values may be 16.

The first value (and consequently, the plurality of values) may be similar to (e.g., may have the same units as) the received value. For example, if the received value is with respect to PWM, the first value may also be with respect to PWM. Similarly, if the received value is with respect to RPM or the percentage, then the first value may also be with respect to RPM or percentage, respectively. However, in further embodiments, the first value may be some conversion from one metric to another (e.g., from PWM to RPM, percentage to PWM, percentage to RPM, etc.).

Additionally, in 406, a modification to the first value may be determined based on a second number of bits of the received value. In one embodiment, the first number of bits may be the most significant bits and the second number of bits may be the least significant bits. For example, the received value may have 8 total bits and the first 4 bits may be used to look up the first value (e.g., in a lookup table) and the second number of bits may be used to calculate a modification to the first value.

The determination (or calculation) of the modification of the first value may involve determining a difference between the first value and a next value, e.g., a next higher value among the plurality of values (e.g., stored in the lookup table). According to various embodiments, this difference may be determined dynamically or "on the fly" during runtime, or may be pre-calculated and stored, e.g., in the memory medium or lookup table. Thus, in one embodiment, the first number of bits may be used to determine the first value and the difference between the first value and the next value. Note that the difference may be stored in the same memory medium (or lookup table) or a different memory medium (or different lookup table).

Determining the modification may also involve multiplying the difference between the first value and the next value by the value of the second bits (e.g., the value of the least significant bits). Finally, the modification may be determined by shifting the product of the multiplication by the second number bits (e.g., the number of least significant bits). Note that there is a significant difference between the value of the least significant bits and the number of least significant bits (value being what the numbers represent and the number being the actual number of bits).

Thus, the modification may be determined according to the following formula:

$$[i(Y-X)] >> \#LSbs;$$

where i is the value of the second number of bits, X is the first PWM value, Y is a next PWM value, and #LSbs is the number of second bits. Note that bitshifting may be equivalent to dividing by 2 raised to the power of the number of second bits (2**#LSbs).

In 408, a new output value may be generated based on the first value and the modification to the first value, e.g., by adding the first value and the modification. The new output value corresponds to a nonlinear function of temperature. Thus, the determination of the modification (and subsequent application of that modification) may transform the boundary point from the first value above to a smooth nonlinear function (i.e., that is based on but different from the function or points defined by the plurality of values). Thus, the determinations, modifications, and generation may operate to convert a linear function to a nonlinear function (e.g., one value along the linear function to another value along the nonlinear function).

Accordingly, in 410, the new output value may be provided for controlling the fan. For example, the new output value may be a PWM duty cycle that is provided to a PWM generator. The PWM generator may then control the fan based on the new output value. Alternatively, the new output may be an RPM value or percentage value that is then used to control the fan. Note that the percentage value or RPM value may still ultimately be provided to the PWM generator, but may be further processed before being provided, e.g., converted to a PWM duty cycle value.

The method described above may be performed a plurality of times during operation of the fan, e.g., responsive to changes in temperature in an enclosure cooled by the fan.

In some embodiments, the receiving, determinations, and generation described above may be performed by control logic that intercepts the initial value from the linear output circuitry and modifies it before providing it to the PWM generator, e.g., to convert the linear output to a more desirable nonlinear output.

Figure 5:
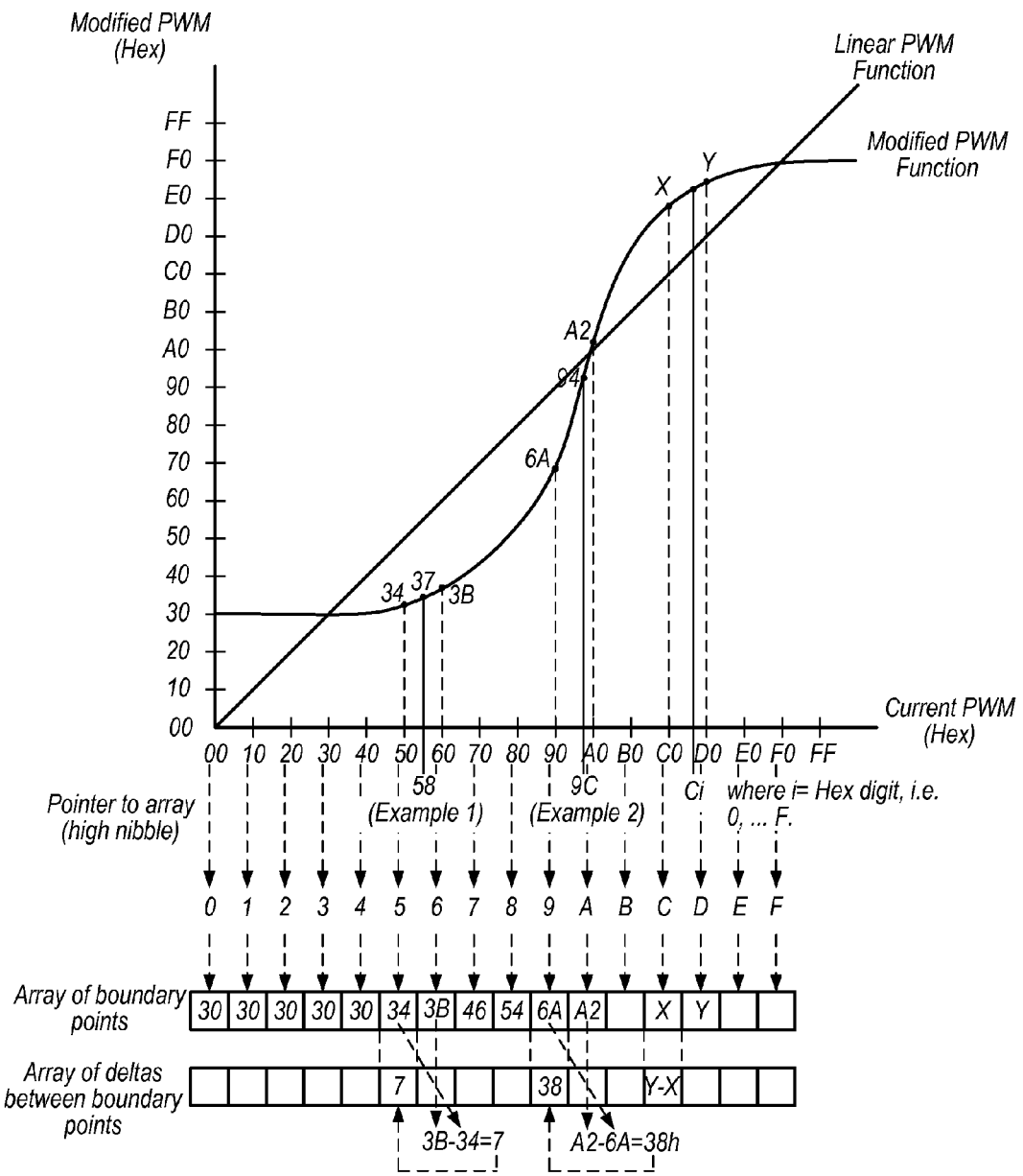
FIG. 5 is a graph showing a representative original linear function and corresponding nonlinear function, according to one embodiment.

FIG. 5—Exemplary Graph

FIG. 5 is an exemplary graph illustrating one embodiment of the conversion from a first linear function to a final nonlinear function. More particularly, the linear output values are plotted along the x axis (shown in hexadecimal) and the modified output values are plotted along the y axis (also shown in hexadecimal). Thus, the original linear function (shown as "Linear PWM Function) has a 1:1 correspondence between the two axes since it is unmodified. However, the resulting nonlinear output values (shown as Modified PWM Function) are also shown on the graph. As shown, the modified PWM function is different than the linear PWM function.

FIG. 5 also shows an array of boundary points (e.g., the lookup table of values) which the "high nibble" is mapped to. In this instance, the array maps the "high nibble" of points along the linear function to boundary points of the nonlinear function, as described above. Additionally, a second array stores the deltas between boundary points.

In the first example (shown as "Example 1"), the received value from the linear function is 58. The lower nearby boundary point (which is pointed to by the high nibble of the bits representing "58", which is "5") is 34, which the first array indicates. The second array then indicates that the difference between this boundary point and the next boundary point is 7 (3B-34). Thus, in this example, the formula is:

$$\text{Modified } PWM = 34h + (7*8)/10 \text{ or } 34h + (7*8) >> 4 = 37$$

The result of this is 37, as shown in FIG. 5.

Similarly, for the second example, the input value is "9C". The high nibble of this value is mapped to 6A and the next highest point is A2, with a difference of 38, as shown in the first and second arrays. Thus, in this example, the formula is:

$$\text{Modified } PWM = 6Ah + (38*C)/10h \text{ or } 6Ah + (38*C) >> 4 = 94h$$

The result of this is 94, as shown in FIG. 5.

Thus, FIG. 5 illustrates two examples and a graph which corresponds to one embodiment of the method of FIG. 4.

FURTHER EMBODIMENTS

Note that the methods described above may be applied for a variety of instances other than fan control. Thus, the method above may be generalized for conversion of any monotonic function into a desired nonlinear function, e.g., to control physical systems. For example, the control could be applied to water pumping, car control, fuel injection, etc.

ADVANTAGES

The methods described above have significant advantages over prior solutions. Previous algorithms typically used linear algorithms or piecewise linear approximations to generate a nonlinear function. However, such approximations required intensive computation (e.g., to execute the linear function in each segment) as well as complicated hardware and/or firmware to perform the computations. The present methods do not suffer from such deficiencies. More specifically, the calculations required to generate the nonlinear function points above are simply performed, without requiring division.

Further, such piecewise functions only contain a limited number of segments (e.g., 5) and are unable to yield a smooth curve, unlike the present resulting nonlinear functions. Further, in prior solutions, each segment had associated parameters (such as max_PWM or min_PWM, segment range, etc.). These parameters are no longer required using the present method.

Additionally, these prior piecewise solutions required a lengthy and complicated process for programming the algorithm for the desired response. However, in the methods above, the user may easily program the nonlinear function by simply changing the boundary point values (e.g., the points in the lookup table). Further, there are more flexible curve shapes available—they do not have to be monotonically increasing in shape. Also, shifting the curve can be achieved by only changing one parameter (e.g., the minimum temperature) and changing the slope of the curve can be similarly achieved by changing the temperature range.

Further, minimum and maximum parameters (e.g., PWM_min and PWM_max) can be eliminated since the stored values may already include that information, e.g., by programming a constant value (PWM_min) into one or several entries at the beginning and another constant value (PWM_max) into one or several entries at the end.

Additionally, the methods described herein may be easily inserted or utilized with existing linear output systems, e.g., by inserting between existing fan control computations (e.g., PWM computations) and output circuitry (e.g., PWM generators, post processing algorithms, such as RRCC, etc.).

Numerous variations and modifications will become apparent to those skilled in the art once the above disclosure is fully appreciated. It is intended that the following claims be interpreted to embrace all such variations and modifications.

What is claimed is:

1. A method for controlling a fan, comprising:
   receiving a value for controlling the fan, wherein the value comprises a first number of bits, wherein the value corresponds to a control function based on temperature;
   determining a first value using a first number of bits of the value;
   determining a modification to the first value based on a second number of bits of the value;
   generating a new output value based on the first value and the modification to the first value, wherein the new output value corresponds to a first nonlinear function of temperature; and
   providing the new output value for controlling the fan.

2. The method of claim 1, wherein the first number of bits of the value are most significant bits and wherein the second number of bits of the value are least significant bits.

3. The method of claim 1, wherein said determining the modification comprises:
   determining a difference between the first value and a next, higher value.

4. The method of claim 3, wherein said determining the modification further comprises:
   multiplying the difference between the first value and the next value by the value of the second number of bits; and
   shifting the product of said multiplying by the second number of bits.

5. The method of claim 3, wherein the difference between the first value and the next value is pre-stored.

6. The method of claim 1, wherein said determining the modification to the first value is performed using:

$[i(Y-X)] \gg \#LSbs;$ wherein i is the value of the second number of bits, X is the first value, Y is a next, higher value, and #LSbs is the second number of bits of the value.

7. The method of claim 1, wherein said determining comprises utilizing a lookup table including a plurality of values.

8. The method of claim 1, wherein the control function is a linear function based on temperature.

9. The method of claim 7, wherein the new output value comprises a PWM (Pulse Width Modulated) value.

10. The method of claim 7, wherein the new output value comprises an RPM (revolutions per minute) value.

11. A system, comprising:
    a PWM generator configured to generate a PWM (Pulse Width Modulated) signal for controlling a fan in response to input; and
    control logic coupled to the PWM generator, wherein the control logic comprises a memory medium which stores a plurality of values, wherein the control logic is configured to:
    receive a value for controlling the fan, wherein the value comprises a first number of bits, wherein the value corresponds to a control function based on temperature;
    determine a first value from the plurality of values using a first number of bits of the value;
    determine a modification to the first value based on a second number of bits of the value;
    generate a new output value based on the first value and the modification to the first PWM value, wherein the new output value corresponds to a first nonlinear function of temperature; and
    provide the new output value as input to the PWM generator for controlling the fan.

12. The system of claim 11, wherein the first number of bits of the value are most significant bits and wherein the second number of bits of the value are least significant bits.

13. The system of claim 11, wherein said determining the modification comprises:
    determining a difference between the first value and a next value in the plurality of values.

14. The system of claim 13, wherein said determining the modification further comprises:
    multiplying the difference between the first value and the next value by the value of the second number of bits; and
    shifting the product of said multiplying by the second number of bits.

15. The system of claim 13, wherein the memory medium stores the difference between the first value and the next value.

16. The system of claim 11, wherein said determining the modification to the first PWM value is performed using:

$[i(Y-X)] \gg \#LSbs;$ wherein i is the value of the second number of bits, X is the first value, Y is the next value in the plurality of values, and #LSbs is the second number of bits of the value.

17. The system of claim 11, wherein the control function is a linear function based on temperature.

18. The system of claim 11, wherein the memory medium stores a minimum value for an initial point, and wherein the memory medium stores a maximum value for a final point.

19. The system of claim 11, further comprising:
    linear output logic coupled to the control logic, wherein the linear output logic is configured to provide the value according to the control function of temperature.

20. A method for controlling a fan, comprising:
    receiving a first value for controlling the fan, wherein the value corresponds to a point of a linear function;
    mapping the first value to a second value, wherein the second value corresponds to a point of a nonlinear function;
    controlling the fan using the second value.

21. A non-transitory computer accessible memory medium comprising program instructions for controlling a physical system, wherein the program instructions are executable to:
    receive an initial value for controlling the physical system, wherein the value comprises a first number of bits, wherein the value corresponds to a linear function;
    retrieve a first value from a memory location using a first number of bits of the initial value;
    determine a modification to the first value based on a second number of bits of the value;
    generate a new output value for controlling the physical system based on the first value and the modification to the first value, wherein the new output value corresponds to a nonlinear function; and
    provide the new output value to control the physical system.

22. The memory medium of claim 21, wherein the first number of bits of the value are most significant bits and wherein the second number of bits of the value are least significant bits.

23. The memory medium of claim 21, wherein said determining the modification to the first value is performed using:

$[i(Y-X)] \gg \#LSbs;$ wherein i is the value of the second number of bits, X is the first value, Y is a next value, and #LSbs is the second number of bits of the initial value.

24. The memory medium of claim 23, wherein the memory medium stores the difference between Y and X, wherein said determining the modification comprises retrieving the difference between Y and X from a second memory location.

25. The memory medium of claim 21, wherein the memory medium stores a plurality of values, wherein the first value is from the plurality of values, wherein the plurality of values corresponds to a first nonlinear function, wherein the new output value corresponds to a second nonlinear function which is different than the first nonlinear function.

* * * * *